US011082942B2

(12) United States Patent
Luo et al.

(10) Patent No.: US 11,082,942 B2
(45) Date of Patent: Aug. 3, 2021

(54) RE-SYNCHRONIZATION MANAGEMENT FOR WIRELESS COMMUNICATIONS IN UNLICENSED SPECTRUM

(71) Applicant: QUALCOMM Incorporated, San Diego, CA (US)

(72) Inventors: Tao Luo, San Diego, CA (US); Wanshi Chen, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/860,962

(22) Filed: Apr. 28, 2020

(65) Prior Publication Data

US 2020/0260399 A1  Aug. 13, 2020

Related U.S. Application Data

(63) Continuation of application No. 14/825,843, filed on Aug. 13, 2015, now Pat. No. 10,674,467.
(Continued)

(51) Int. Cl.
    *H04W 56/00* (2009.01)
    *H04W 72/04* (2009.01)
    (Continued)

(52) U.S. Cl.
    CPC ....... *H04W 56/0045* (2013.01); *H04W 56/00* (2013.01); *H04W 72/0446* (2013.01);
    (Continued)

(58) Field of Classification Search
    CPC .................................................. H04W 56/00
    See application file for complete search history.

(56) References Cited

U.S. PATENT DOCUMENTS 9,363,798 B2    6/2016 Lee et al.
2012/0307698 A1 12/2012 Tavildar et al.
(Continued)

FOREIGN PATENT DOCUMENTS

CN       103370896 A    10/2013
WO   WO-2007042721 A1   4/2007
(Continued)

OTHER PUBLICATIONS

ETSI EN 301 893 V1.7.2 (Jul. 2014) (Year: 2014).*
(Continued)

*Primary Examiner* — Jeffrey M Rutkowski
*Assistant Examiner* — Chae S Lee
(74) *Attorney, Agent, or Firm* — Liem T. Do

(57) ABSTRACT

Management of re-synchronization procedures for long term evolution (LTE)/LTE-Advanced (LTE-A) systems with unlicensed spectrum is disclosed. In managing re-synchronization procedures, a base station selects and sends out an enablement indication of the uplink and/or downlink re-synchronization procedure selected. The base station may select the re-synchronization procedures by itself or in coordination with neighboring base stations. Once the indication for the uplink re-synchronization procedure is received at a user equipment (UE), the UE performs its extended clear channel assessment (ECCA) check, but, when the ECCA check is successful, the UE will delay data transmission until the next re-synchronization boundary defined by the selected uplink re-synchronization procedure. With the delayed transmission, the UE performs a clear channel assessment (CCA) check prior to the re-synchronization boundary in order to determine whether the channel is still clear for transmission after the idle period.

20 Claims, 10 Drawing Sheets

Related U.S. Application Data

(60) Provisional application No. 62/043,634, filed on Aug. 29, 2014.

(51) Int. Cl.
*H04W 72/12* (2009.01)
*H04W 74/08* (2009.01)

(52) U.S. Cl.
CPC ... *H04W 72/0453* (2013.01); *H04W 72/1284* (2013.01); *H04W 74/0808* (2013.01)

(56) References Cited

U.S. PATENT DOCUMENTS

| | | |
|---|---|---|
| 2013/0203458 A1 | 8/2013 | Charbit et al. |
| 2014/0036889 A1 | 2/2014 | Kim et al. |
| 2014/0112289 A1* | 4/2014 | Kim .................. H04L 5/0078 370/329 |
| 2014/0179331 A1* | 6/2014 | Futaki ............... H04W 56/0045 455/450 |
| 2016/0066294 A1 | 3/2016 | Luo et al. |
| 2017/0005775 A1 | 1/2017 | Cheng et al. |
| 2017/0230970 A1 | 8/2017 | Kim et al. |

FOREIGN PATENT DOCUMENTS

| | | |
|---|---|---|
| WO | WO-2012078565 A1 | 6/2012 |
| WO | WO-2013167557 A1 | 11/2013 |

OTHER PUBLICATIONS

Alcatel-Lucent., et al., "Review of Regulatory Requirements for Unlicensed Spectrum", 3GPP Draft; RP-140808 Regulatory Review V3-Clean, 3rd Generation Partnership Project (3GPP), Mobile Competence Centre 650, Route Deslucioles, F-06921, Sophia-Antipolis Cedex; France vol. TSG RAN, no.Sophia-Antipolis, France; 20140610-20140613, Jun. 6, 2014 (Jun. 6, 2014), XP050781790, URL: https://www.3gpp.org/ftp/Meetings_3GPP_SYNC/RAN/Docs/ ,25 Pages.

ETSI EN 301 893: "Broadband Radio Access Networks (BRAN); 5 GHz High Performance RLAN; Harmonized EN Covering the Essential Requirements of Article 3.2 of the R&TTE Directive", V1.7.2 (Jul. 2014), pp. 23-25.

European Search Report—EP18162776—Search Authority—Munich—dated Jul. 24, 2018.

Hisilicon: "Scenarios, spectrum considerations and preliminary assessment results of U-LTE," 3GPP Draft; RWS-140005 Scenarios, Spectrum Considerations and Preliminary Assessment Results of U-LTE, 3rd Generation Partnership Project (3GPP), Mobile Competence Centre ; 650, Route Des Lucioles ; F, no. Sophia Antipolis, France; 20140615 Jun. 6, 2014 (Jun. 6, 2014), XP050774754, 21 pages.

International Preliminary Report on Patentability—PCT/US2015/ 045302, The International Bureau of WIPO—Geneva, Switzerland, dated Mar. 9, 2017.

International Search Report and Written Opinion—PCT/US2015/ 045302—ISA/EPO—dated Oct. 27, 2015.

\* cited by examiner

US 11,082,942 B2

RE-SYNCHRONIZATION MANAGEMENT FOR WIRELESS COMMUNICATIONS IN UNLICENSED SPECTRUM

CROSS-REFERENCE TO RELATED APPLICATIONS

This application is a continuation application which claims the benefit of U.S. patent application Ser. No. 14/825,843, entitled, "RE-SYNCHRONIZATION MANAGEMENT IN LTE/LTE-A WITH UNLICENSED SPECTRUM," filed on Aug. 13, 2015, and the benefit of U.S. Provisional Patent Application No. 62/043,634, entitled, "RE-SYNCHRONIZATION MANAGEMENT IN LTE/LTE-A WITH UNLICENSED SPECTRUM," filed on Aug. 29, 2014, both of which are expressly incorporated by reference herein in their entirety.

BACKGROUND

Field

Aspects of the present disclosure relate generally to wireless communication systems, and more particularly, to re-synchronization management in long term evolution (LTE)/LTE-Advanced (LTE-A) with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining, by a base station, a downlink enablement status for a downlink re-synchronization procedure over an unlicensed spectrum, and transmitting, by the base station, a downlink status indication identifying the downlink enablement status.

In an additional aspect of the disclosure, a method of wireless communication including receiving, at a UE, an indication identifying an uplink re-synchronization procedure for use in an unlicensed spectrum, performing, by the UE, an extended clear channel assessment (ECCA) check, in response to detecting data for transmission, delaying transmission, by the UE, in response to successfully completing the ECCA check prior to a re-synchronization boundary defined in the uplink re-synchronization procedure, performing, by the UE, a clear channel assessment (CCA) check in a subframe preceding the re-synchronization boundary, and transmitting, by the UE, the data beginning at the re-synchronization boundary in response to successfully completing the CCA check.

In an additional aspect of the disclosure, an apparatus configured for wireless communication includes means for determining, by a base station, a downlink enablement status for a downlink re-synchronization procedure over an unlicensed spectrum, and means for transmitting, by the base station, a downlink status indication identifying the downlink enablement status.

In an additional aspect of the disclosure, an apparatus configured for wireless communication including means for receiving, at a UE, an indication identifying an uplink re-synchronization procedure for use in an unlicensed spectrum, means for performing, by the UE, an ECCA check, in response to detecting data for transmission, means for delaying transmission, by the UE, in response to successfully completing the ECCA check prior to a re-synchronization boundary defined in the uplink re-synchronization procedure, means for performing, by the UE, a CCA check in a subframe preceding the re-synchronization boundary, and means for transmitting, by the UE, the data beginning at the re-synchronization boundary in response to successfully completing the CCA check.

In an additional aspect of the disclosure, a computer-readable medium having program code recorded thereon. This program code includes code to determine, by a base station, a downlink enablement status for a downlink re-synchronization procedure over an unlicensed spectrum, and code to transmit, by the base station, a downlink status indication identifying the downlink enablement status.

In an additional aspect of the disclosure, a computer-readable medium having program code recorded thereon. This program code includes code to receive, at a UE, an indication identifying an uplink re-synchronization procedure for use in an unlicensed spectrum, code to perform, by the UE, an ECCA check, in response to detecting data for transmission, code to delay transmission, by the UE, in response to successfully completing the ECCA check prior to a re-synchronization boundary defined in the uplink re-synchronization procedure, code to perform, by the UE, a CCA check in a subframe preceding the re-synchronization boundary, and code to transmit, by the UE, the data beginning at the re-synchronization boundary in response to successfully completing the CCA check.

In an additional aspect of the disclosure, an apparatus includes at least one processor and a memory coupled to the processor. The processor is configured to determine, by a base station, a downlink enablement status for a downlink re-synchronization procedure over an unlicensed spectrum, and to transmit, by the base station, a downlink status indication identifying the downlink enablement status.

In an additional aspect of the disclosure, an apparatus includes at least one processor and a memory coupled to the processor. The processor is configured to receive, at a UE, an indication identifying an uplink re-synchronization procedure for use in an unlicensed spectrum, to perform, by the UE, an ECCA check, in response to detecting data for transmission, to delay transmission, by the UE, in response to successfully completing the ECCA check prior to a re-synchronization boundary defined in the uplink re-synchronization procedure, to perform, by the UE, a CCA check in a subframe preceding the re-synchronization boundary, and to transmit, by the UE, the data beginning at the re-synchronization boundary in response to successfully completing the CCA check.

DETAILED DESCRIPTION

Figure 1:
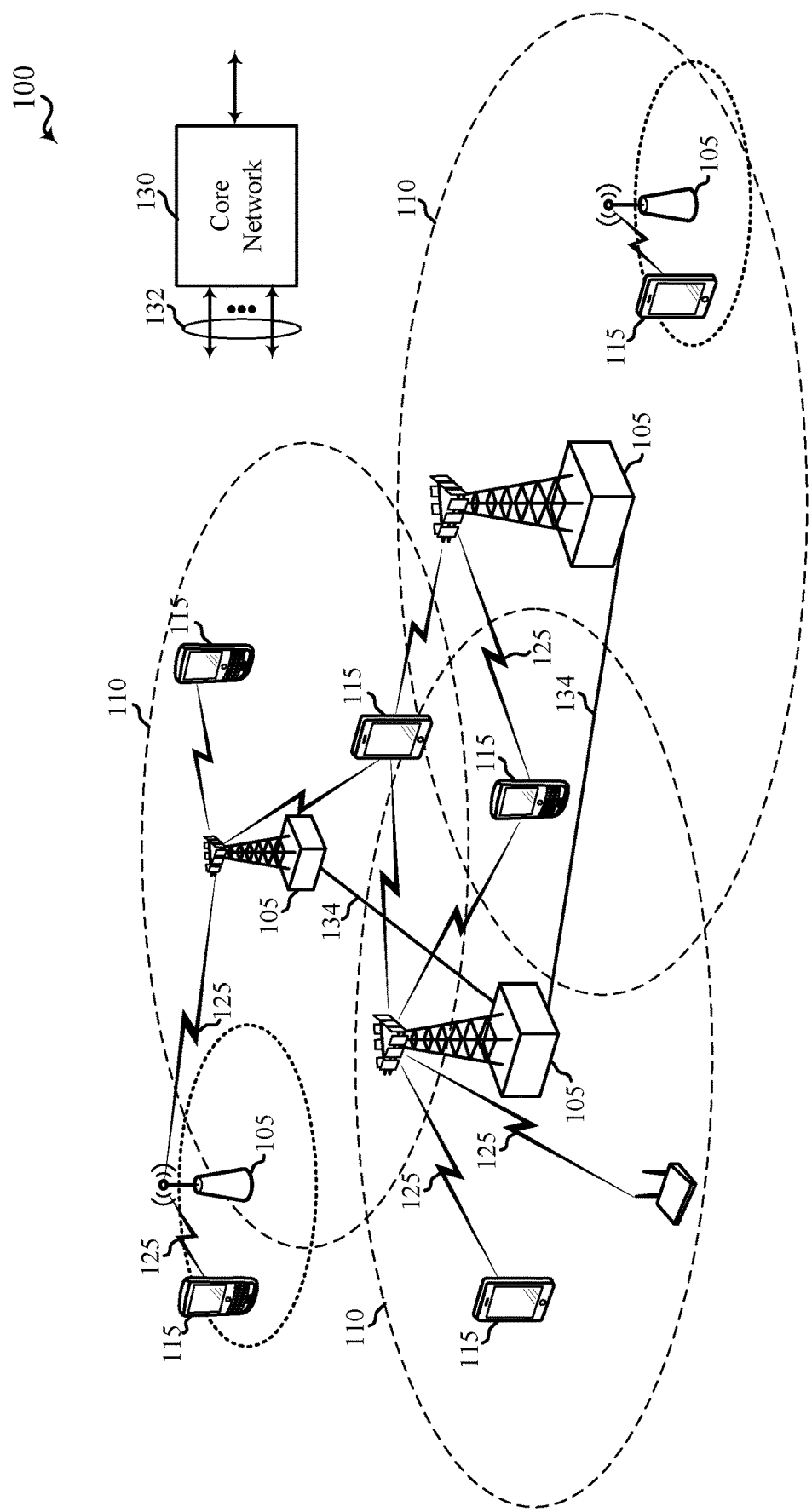
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., Si, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-9.

Figure 2A:
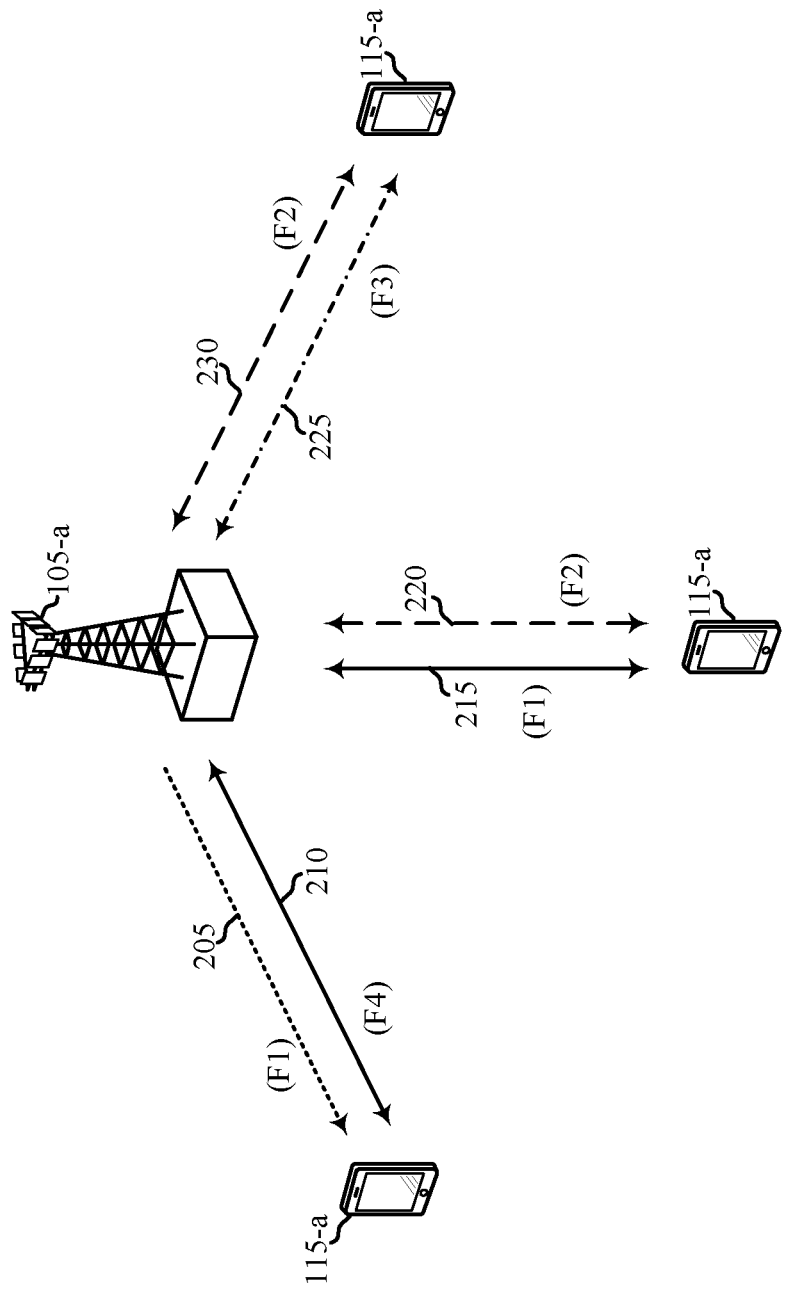
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
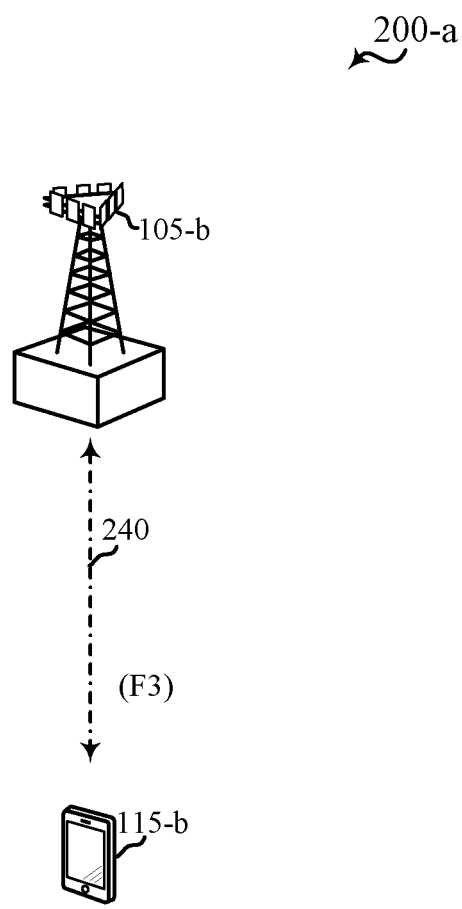
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
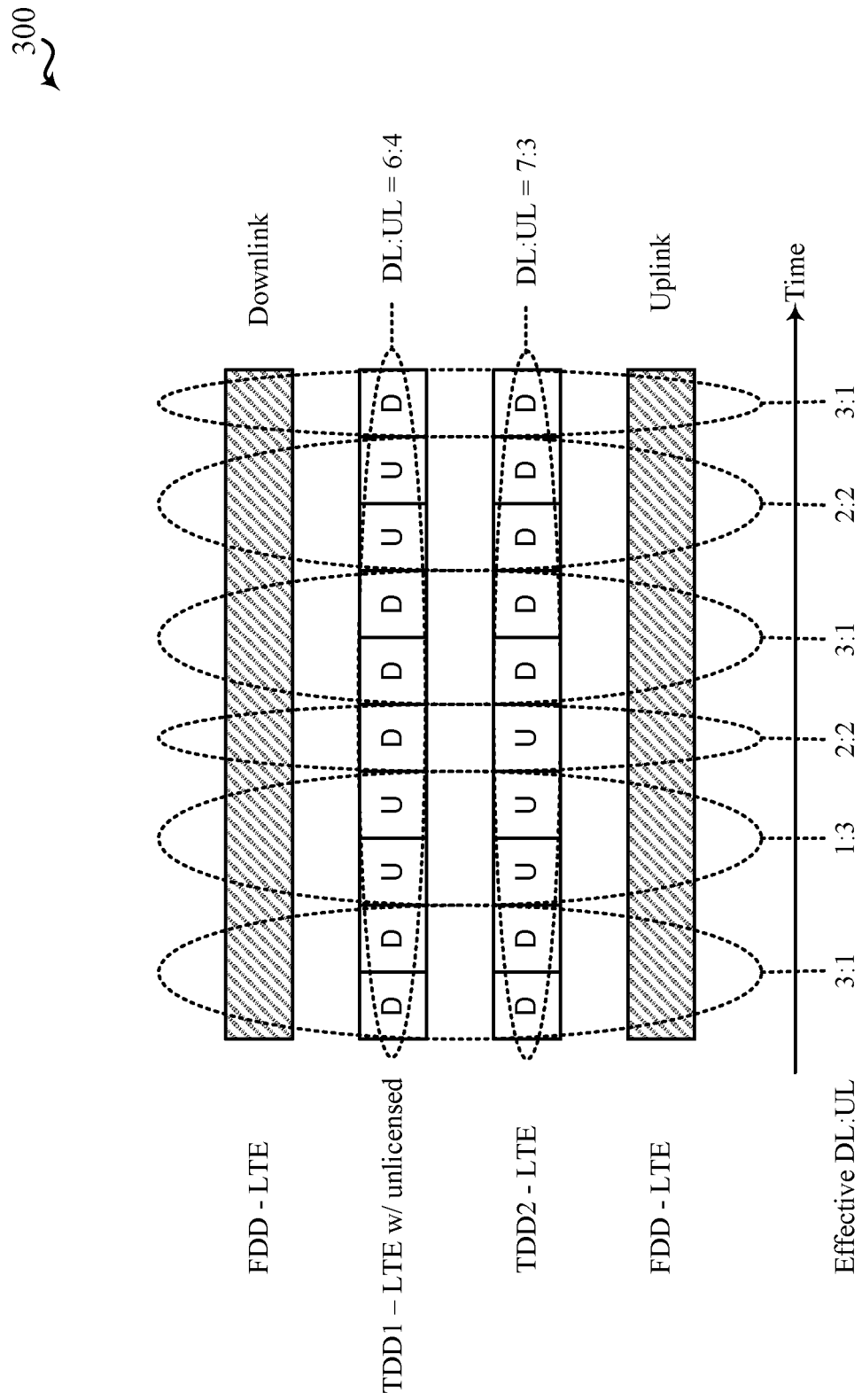
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
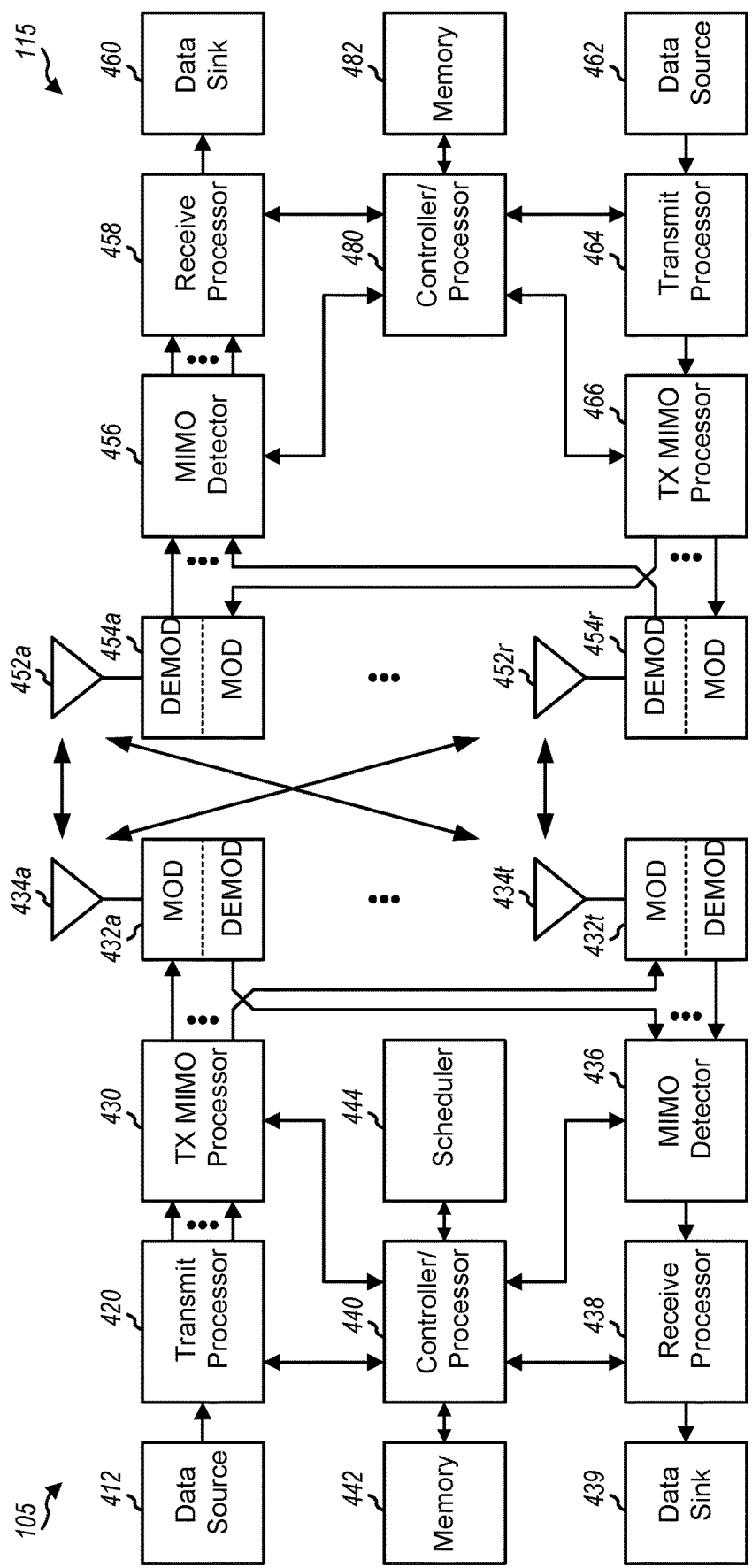
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 8 and 9, and/or other processes for the techniques described herein. The memories 442 and 482 may store data and program codes for the eNB 105 and the UE 115, respectively. A scheduler 444 may schedule UEs for data transmission on the downlink and/or uplink.

Various configurations of LTE/LTE-A networks using unlicensed spectrum may provide for access of the unlicensed spectrum using a frame-based structure. Frame-based designs for LTE/LTE-A with unlicensed spectrum offer many advantages, including common design elements shared with standard LTE systems that use only licensed spectrum. Frame-based systems perform CCA checks at a fixed time during the frame, where the fixed time is usually a small fraction of the frame (typically around 5%). For example, CCA checks may occur in the special subframes in one of seven symbols after the guard period of the special subframe. When a load-based system occupies a channel, transmission gaps occurring between transmission bursts of the load-based system may not always fall into the CCA period of a frame-based system. Load-based systems generally transmit when there is data in its buffer and will often capture the channel until buffer is exhausted. In LTE/LTE-A with unlicensed spectrum, for the frame structure of load-based equipment, the equipment may perform an extended CCA (ECCA) check, in which the operating channel is observed for the duration of a random factor N multiplied by the CCA observation time. N defines the number of clear idle slots resulting in a total idle period to be observed before initiation of the transmission. The value of N may be randomly selected in a range between 1 and the variable, q, every time an ECCA occurs. The selected value of N is then stored in a counter. In various systems, the value of q may be selected by the manufacturer in a range of 4 to 32.

The generation of the random number N may be a function of frame index, public land mobile network (PLMN) identifier (ID), and/or subframe index. Aligning the generation of N across cells of the same operator assists in aligning idle time/transmission time among different cells or UEs of the same operator and, consequently, assists in increasing frequency reuse within the same operator.

Because transmissions from neighboring eNBs could potentially block other neighbor eNB transmissions, it is beneficial to have ECCA alignment between such neighboring eNBs. Thus, it would be beneficial for eNBs of the same operator to start downlink transmissions simultaneously, in order to increase frequency reuse across cells. Otherwise, if one eNB has a CCA or ECCA clearance and begins immediately to transmit before a neighboring eNB has detected clearance, the first eNB's transmission will interfere with the neighboring eNB, potentially causing the neighboring eNB's CCA or ECCA check to fail, thus, blocking transmissions from the neighboring eNB. Similarly, it may also be beneficial to have ECCA alignment between neighboring UEs so that the neighboring UEs nominally do not block each other.

To obtain such ECCA alignment between neighboring eNBs and UEs, generation of the random parameter N can be aligned among eNBs of the same operator (e.g., using a common seed and providing for cell-independent generation). Additionally, a resynchronization (re-sync) boundary may also be defined for the first transmission in a frame. Thus, if a node detects CCA or ECCA clearance before the re-sync boundary, that node will delay transmission until the re-sync boundary and re-perform a CCA check prior to transmission just before the re-sync boundary.

Figure 5:
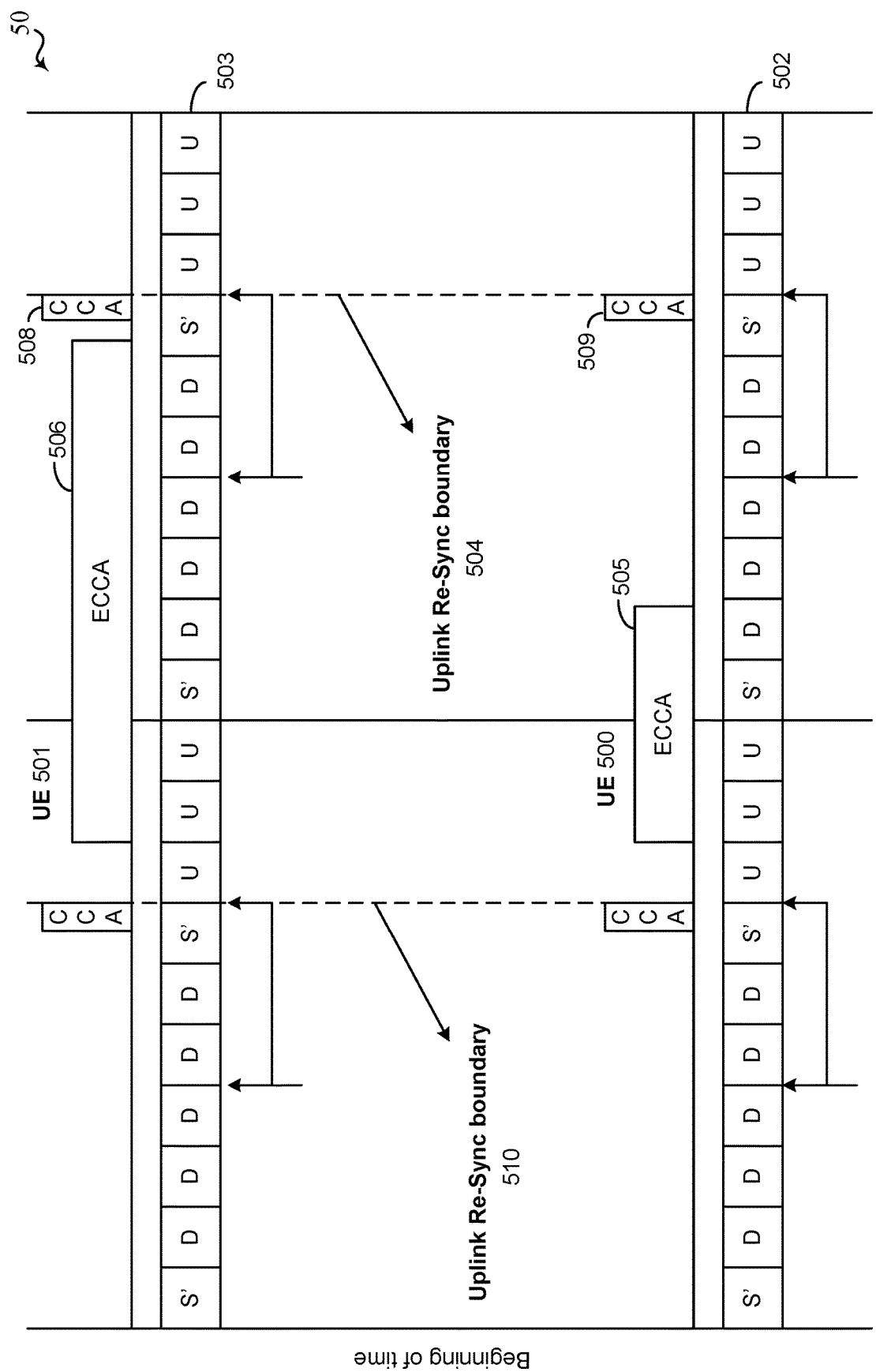
FIG. 5 is a block diagram illustrating communication frames of two load-based UEs.

FIG. 5 is a block diagram illustrating communication frames 502 and 503 of two load-based UEs, UE 500 and UE 501, within a transmission segment 50. UE 500 is configured with a communication frame 502, and UE 501 is configured with a communication frame 503, each having uplink, downlink, and special subframes configured for uplink and downlink communications. The network also defines uplink re-sync boundaries 504 and 510 in order to align the ECCA process for UEs 500-501. In one example operation, UE 500 finishes counting down for ECCA 505, and UE 501 finishes counting down for ECCA 506, both prior to uplink re-sync boundary 504. Moreover, UE 500 finishes ECCA 505 before UE 501 finishes ECCA 506. If UE 500 were to begin transmitting immediately after ECCA 505, the transmission from UE 500 may cause ECCA 506 to fail, thus, preventing UE 501 from transmitting the data in its buffer. Instead, each of UEs 500 and 501 wait after finishing ECCA 505 and 506, respectively, to begin transmissions after re-sync boundary 504. However, since addition time passes after each of ECCA 505 and 506, UEs 500 and 501 perform CCA checks 508 and 509, respectively, prior to re-sync boundary 504.

The re-synchronization procedure helps improve frequency reuse. However, this improvement in reuse comes at the expense of additional complexity and some inefficiency for a given node. For example, a node cannot begin transmitting immediately after CCA/ECCA clearance if the re-sync boundary has not yet been reached. During the idle period before the re-sync boundary, there is the potential that other nodes (e.g., WiFi, non-aligned neighbor nodes from other operators, etc.) may begin transmissions and occupy the channel.

In some cases, there may be no need to have a re-sync procedure, while in other cases, it may actually be detrimental to have a re-sync procedure. For example, in isolated deployments, there would be no need to have a re-sync procedure, as the likelihood for multiple UEs to be present within the isolated certain coverage area may be remote. Furthermore, in a given frame, if a UE is scheduled for transmission in the first uplink subframe after the uplink re-sync boundary but is also scheduled in later uplink subframes, there may reason for implementing a re-sync operation in the later uplink subframes, even though transmission in the first scheduled subframe may be unnecessary.

In various aspects of the present disclosure, a re-sync procedure is managed on a per node basis. Thus, each node (e.g., base station, eNB, etc.) can determine whether the re-sync procedure is enabled/available or not. For example, an eNB can indicate whether it supports downlink or uplink re-sync procedures in a system information broadcast message. The UE may be further configured either semi-statically (e.g., through a RRC message) or dynamically (e.g., through a downlink control indicator (DCI) message) whether uplink re-sync procedures are enabled/available or not for a given frame or subframe.

Figure 6:
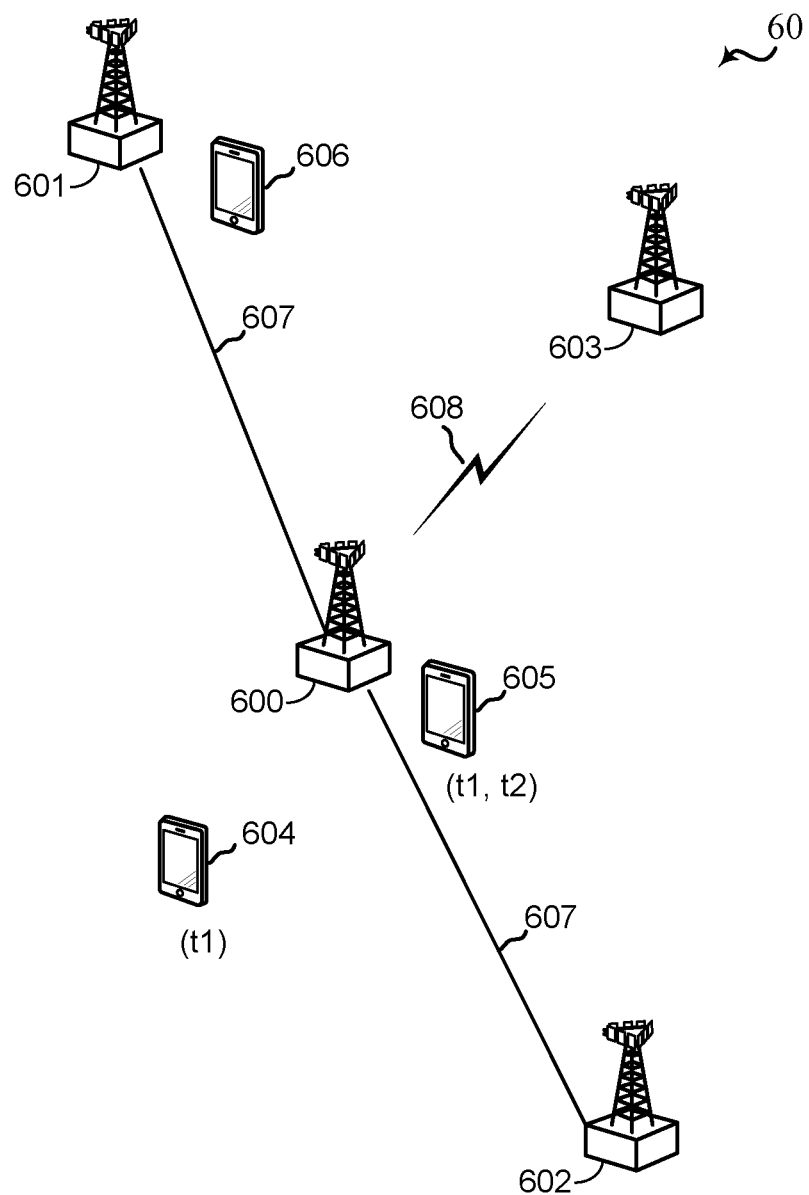
FIG. 6 is a block diagram illustrating a wireless network configured according to one aspect of the present disclosure.

FIG. 6 is a block diagram illustrating wireless network 60 configured according to one aspect of the present disclosure. Wireless network 60 includes base stations 600-602, which are operated by the same wireless network operator and base station 603, which is a neighboring base station operated by a different wireless network operator. Each of base stations 600-603 are configured for communications with a radio access technology (RAT) that may use both licensed and unlicensed spectrum. In one example, base stations 600-603 may operate using LTE/LTE-a with unlicensed spectrum.

In one aspect for aligning ECCA within wireless network 60, base stations 600-602 may communicate with each other over backhaul 607 in order to coordinate selection of a re-sync process. Base stations 600-602 may coordinate selection of both a downlink re-sync process and an uplink re-sync process. Once the configuration of the downlink and/or uplink re-sync process is selected, base stations 600-602 begin broadcasting an enablement status that indicates to other base stations and to UEs 604-606, that a downlink re-sync process is enabled. Base stations 600-602 may also transmit enablement status for uplink re-sync processes to UEs 604-606. Such uplink enablement statuses may be broadcast to all UEs or may be specifically transmitted to a particular UE in UE-specific search space.

For example, UE 604 may be indicated with a different uplink/downlink subframe configuration from UE 605. Accordingly, base station 600 may select different configurations of re-sync processes for each UE. Base station 600 may then transmit each uplink enablement status that corresponds to the selected re-sync process configuration to the particular UE for which the re-sync process configuration has been selected. Base station 600 would transmit such uplink enablement status indicators over UE-specific search space.

It should be noted that aspects of the present disclosure may provide for a mapping between the particular uplink/downlink subframe configuration and a corresponding re-sync process configuration. An uplink/downlink subframe configuration may be configured, such that a UE will be indicated to have two or more re-sync boundaries in a frame. For example, a downlink/uplink subframe configuration with the sequence, DDS S', may have two uplink re-sync boundaries defined. The first re-sync boundary may be defined one-symbol before the first uplink subframe, while the second re-sync boundary may be defined one-symbol before the fourth uplink subframe. The indications for the number and location of re-sync may be standardized through updates to current specification that provide a mapping between particular subframe configurations and their corresponding number and location of re-sync boundaries. The indications of re-sync boundaries may also be provided by an eNB through various signaling (e.g., RRC signaling, DCI signaling, etc.)

Additionally, when multiple re-sync boundaries are defined in a given frame, UEs may be further indicated to not transmit for a predefined or dynamically-defined duration right before the re-sync boundaries. The pre-re-sync boundary idle time may facilitate the re-sync procedure.

Figure 7:
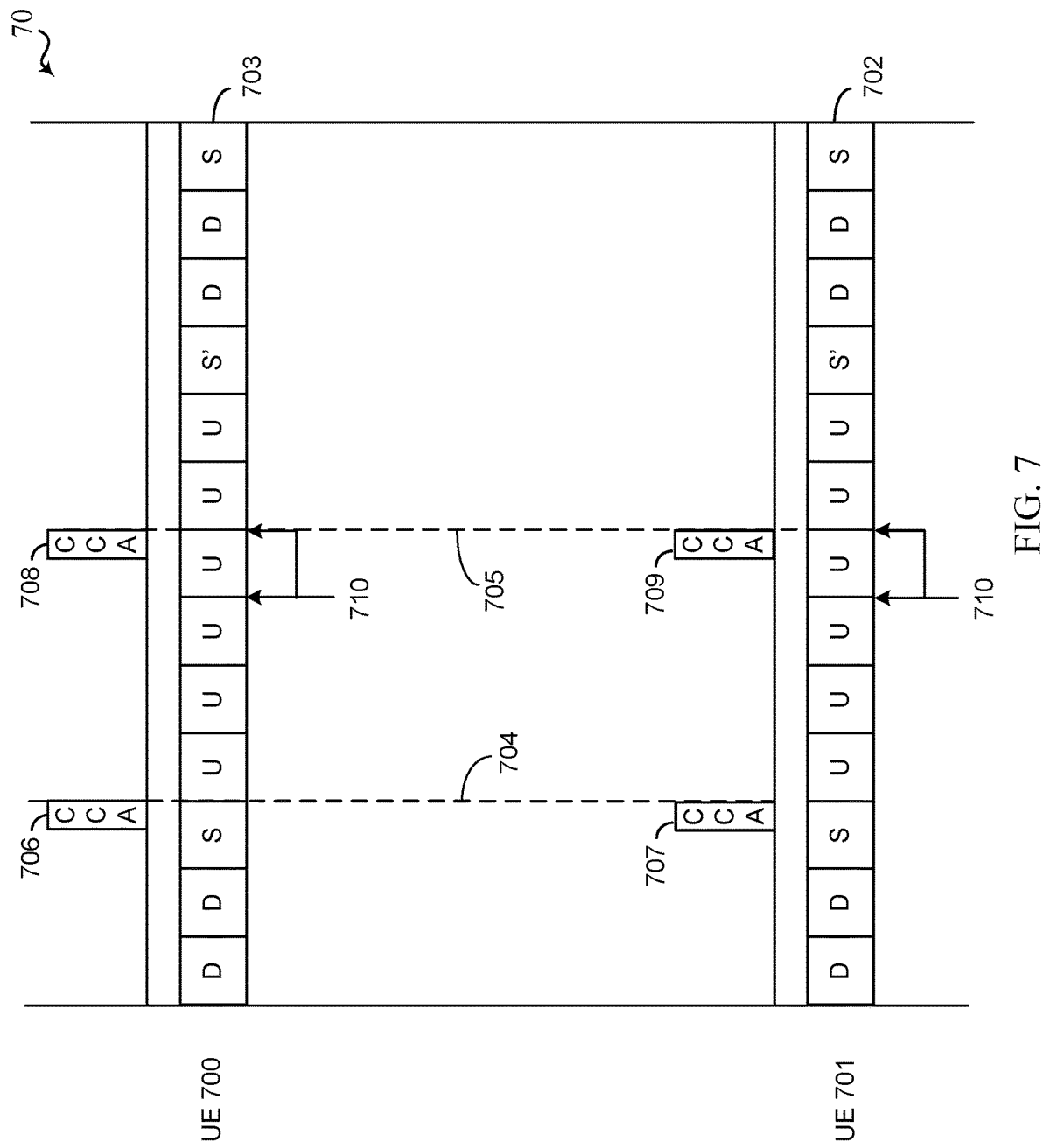
FIG. 7 is a block diagram illustrating a transmission segment over unlicensed spectrum in a wireless system configured according to one aspect of the present disclosure.

FIG. 7 is a block diagram illustrating a transmission segment 70 over unlicensed spectrum in a wireless system configured according to one aspect of the present disclosure. Transmission segment 70 illustrates transmission streams 702 and 703 from UEs 700 and 701. Each of UEs 700 and 701 is indicated with an uplink/downlink subframe configuration DDSUUUUUUS'. The base station serving UEs 700 and 701 (not shown) selects a re-sync procedure configuration that provides for two re-sync boundaries 704 and 705. Prior to re-sync boundary 704, each of UEs 700 and 701 will perform a CCA check, CCA checks 706 and 707, before beginning uplink transmissions on the first uplink subframe of the frame. Each of UEs 700 and 701 will also perform a CCA check, CCA checks 708 and 709, before beginning uplink transmissions after re-sync boundary 705. The re-sync procedure configuration that defines re-sync boundaries 704 and 705 also instruct UEs 700 and 701 to refrain from transmissions for a duration 710 prior to re-sync boundary 705. This silent period will prevent any transmissions from either of UEs 700 or 701 from interfering with the CCA checks of the other UE at re-sync boundary 705.

It should be noted that the silent or idle period before subsequent re-sync boundaries may be obtained by UEs in multiple ways depending on the aspect of the disclosure implemented. For example, the silent or idle period may be explicitly indicated to UEs through the enablement status message that indicates which re-sync process configuration is selected. In other aspects, the silent or idle period may be defined in standards information and known to UEs as connected with the particular re-sync process configuration. The present disclosure is not limited to any particular means for delivering such information to UEs.

Referring back to FIG. 6, in additional aspects of the present disclosure, base station 603, which is operated by a different wireless network operator than base stations 600-602, may also conform to the downlink re-sync process for aligning ECCA within wireless network 60. In one example aspect, base station 603 may directly communicate with base stations 600-602 over a communication link 608 to participate in the coordination of the re-sync process selection. In another example aspect, base station 603 may receive and read the enablement status information broadcast by base stations 600-602 in various system information blocks. Base station 603 would then use the indication for the downlink re-sync process in the system information block to configure its own re-sync boundaries for downlink communications.

In an additional aspect of the present disclosure, base station 601 may determine that only UE 606 is scheduled for communication within its coverage area. As such, base station 601 transmits an enablement status to UE 606 that indicates no uplink re-sync procedure will be available.

Enablement status signals may be transmitted by base stations 600-603 either semi-statically, such as through layer 3 signaling (e.g., radio resource control (RRC) signaling), or dynamically, such as through layer 1 signaling (e.g., downlink control indicator (DCI) signaling) and may be provided for on a frame or subframe basis. For example, at a time, t1, both UEs 604 and 605 are present within the coverage area of base station 600. A selected re-sync procedure that defines re-sync boundaries is indicated to UEs 604 and 605 through an enablement status indicator in an RRC message. In response to this message, UEs 604 and 605 configure transmissions based on the re-sync boundary or boundaries defined by the re-synch procedure associated with the enablement status indicator. At time, t2, UE 604 has moved out of the coverage area of base station 600, while UE 605 remains. Because base station 600 will only be scheduling communications for UE 605, it transmits an updated enablement status indicator in a DCI message, which indicates to UE 605 that no re-sync procedure will be used for the next subframe or frame. Accordingly, as soon as UE 605 detects a clear ECCA, it may begin to transmit immediately in that subframe or frame.

In order to achieve a finer control over ECCA alignment, a re-sync procedure configured according to additional aspects of the present disclosure may be managed on a per frame basis, such that some frames may use re-sync procedure, while others do not. For example, as illustrated before, if an eNB schedules only one UE in a frame, there would be no need to perform an uplink re-sync procedure for that particular frame. The eNB may provide an indication to the UE to omit any uplink re-sync procedures for that frame.

Figure 8:
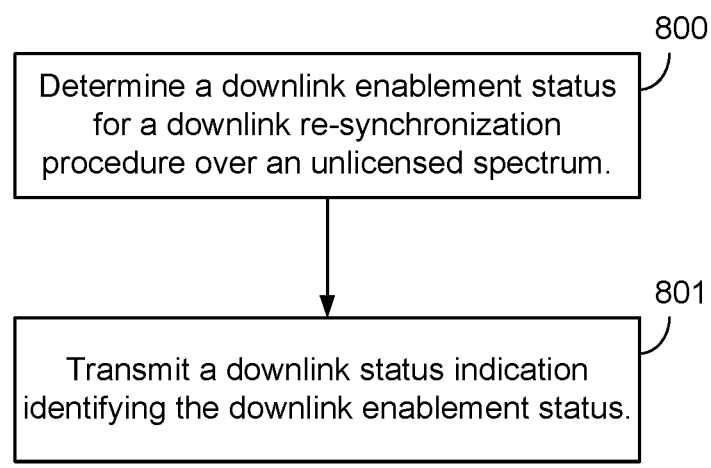
FIGS. 8 and 9 are functional block diagrams illustrating example blocks executed to implement aspects of the present disclosure.

FIG. 8 is a functional block diagram illustrating example blocks executed to implement one aspect of the present disclosure. At block 800, a base station determines a downlink enablement status for a downlink re-sync procedure over an unlicensed spectrum. The base station may determine and select such a downlink re-sync procedure by itself or through coordination with neighboring base stations. The coordination may occur with other base stations operated by the same wireless network operator, for example over the X2 or other such backhaul links, and may also occur with neighboring base stations from other wireless network operators, for example through other communication means. A base station may also make a determination for a particular re-sync procedure by reading the system information broadcast messages from neighboring base stations that broadcast enablement status messages indicating neighboring re-sync procedures. At block 801, the base station transmits a downlink status indication that identifies the downlink enablement status and corresponding re-sync process configuration for the node, frame, or subframe.

Similarly, the base station may also select an uplink re-sync procedure for operation within its coverage area. Once selected, the base station transmits the selected procedure, through an enablement status message to served UEs. The transmission of the enablement status may be implemented through a broadcast message to all served UEs or may be transmitted directly to individual UEs within the UE-specific search space.

Figure 9:
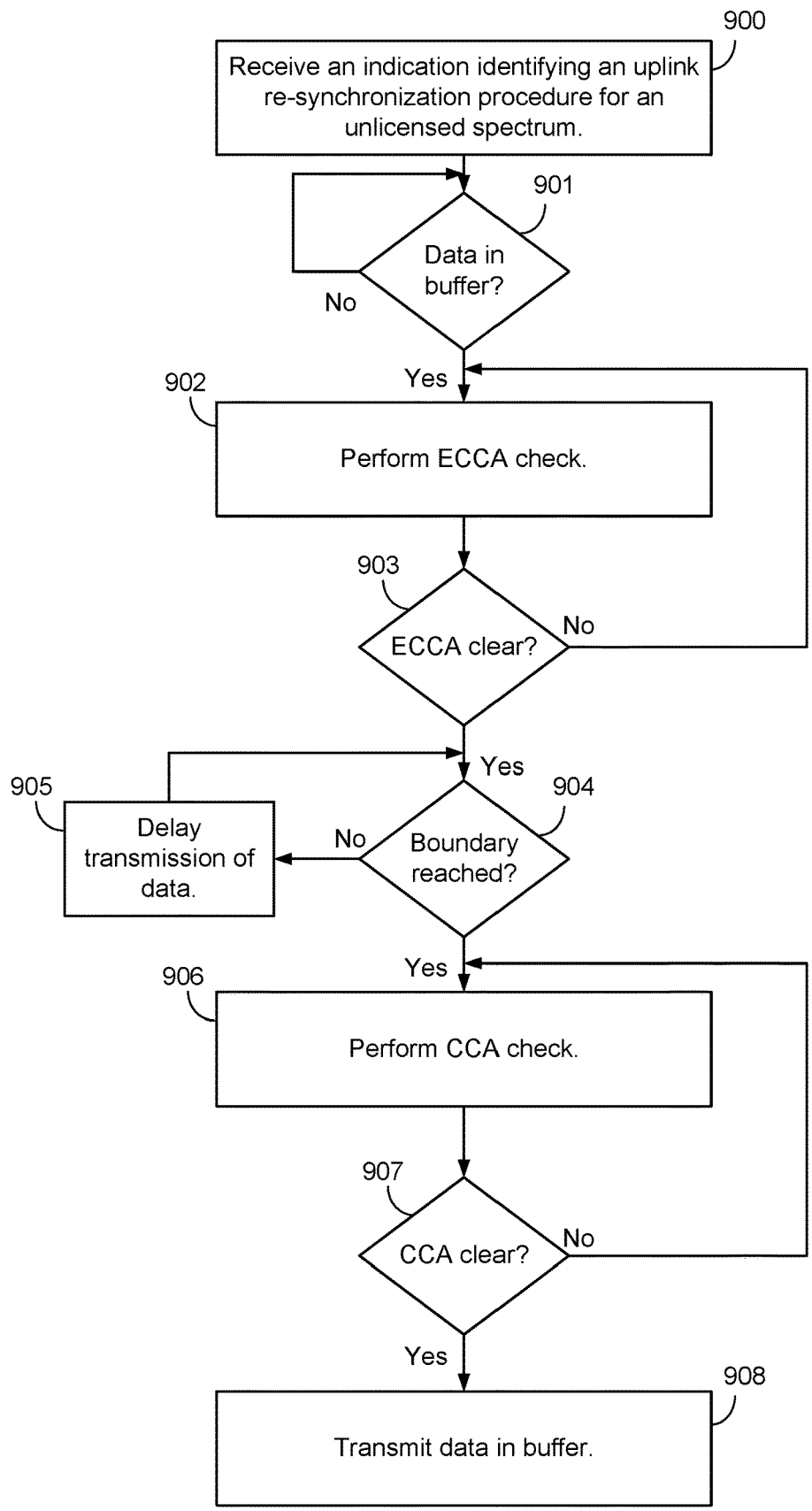

FIG. 9 is a functional block diagram illustrating example blocks executed to implement one aspect of the present disclosure. At block 900, a UE receives an indication identifying an uplink re-sync procedure for an unlicensed spectrum. The indication may be received directly from a serving base station or may be received through system information broadcast messages from the serving base station. The indication may also semi-statically or dynamically set the uplink re-sync procedure for the next frames or subframes.

At block 901, as a load-based equipment, the UE will make determination of whether there is data in its buffer ready for transmission. If not, the UE will continue to wait until it detects data in the buffer. If there is data in the buffer for transmission, than, at block 902, the UE performs an ECCA check to check whether the unlicensed channel is available for transmission. At block 903, a determination is made whether the ECCA check is clear. If other transmissions are detected on the unlicensed channel, the UE will back off for a period and continue the ECCA check for the designated ECCA length. Otherwise, if the ECCA check is detected to be clear, then, at block 904, another determination is made whether the re-sync boundary defined by the enabled re-sync procedure has been reached. If not, then, at block 905, the UE delays transmission of the data.

At block 904, if the re-sync boundary has been reached, then, at block 906, the UE performs a CCA check to determine if the unlicensed channel is still available for transmission. Because the UE may have entered an idle or silent period while waiting for the re-sync boundary after performing a successful ECCA check at block 902, other transmitters, such as WIFI or other unlicensed transmissions, may have begun transmitting on the unlicensed channel. At block 907, a determination is made whether the CCA check is detected to be clear. If not, then, the UE will not transmit, but perform another ECCA check at block 902 and begin the process again for transmissions at the next re-sync boundary. Otherwise, if the CCA check is detected as clear, at block 907, the UE will begin transmitting the data in the buffer at block 908.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8 and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C) and any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), an indication identifying an uplink re-synchronization procedure for use in an unlicensed spectrum;
   performing, by the UE, an extended clear channel assessment (ECCA) check prior to a re-synchronization boundary associated with the uplink re-synchronization procedure;
   performing, by the UE and based on success of the ECCA check, a clear channel assessment (CCA) check in a subframe preceding the re-synchronization boundary; and
   transmitting, by the UE, data beginning at the re-synchronization boundary in response to successfully completing both the CCA check and the ECCA check.

2. The method of claim 1, wherein the uplink re-synchronization procedure has an uplink/downlink subframe configuration assigned to the UE that includes two or more subframe boundaries within a single frame.

3. The method of claim 2, further comprising receiving, by the UE, an idle indication indicating the UE refrain from data transmission for a predetermined time period prior to one of the two or more subframe boundaries, wherein the ECCA is performed during the predetermined time period in the subframe preceding the re-synchronization boundary.

4. The method of claim 1, further comprising delaying, by the UE in response to successfully completing the CCA check in a subframe preceding the re-synchronization boundary, transmission of the data.

5. The method of claim 1, wherein the indication is received via one of:
   a system broadcast message;
   semi-static signaling; or
   dynamic signaling.

6. The method of claim 1, further comprising receiving, by the UE, a subsequent status indication in a subsequent frame after the receiving the indication, wherein the subsequent status indication indicates deactivation of the uplink re-synchronization procedure.

7. The method of claim 1, wherein the indication identifying the uplink re-synchronization procedure further indicates a timing of the re-synchronization boundary.

8. An apparatus configured for wireless communication, the apparatus comprising:
   at least one processor; and
   a memory coupled to the at least one processor, wherein the at least one processor is configured to:
      receive, at a user equipment (UE), an indication identifying an uplink re-synchronization procedure for use in an unlicensed spectrum;
      perform an extended clear channel assessment (ECCA) check prior to a re-synchronization boundary associated with the uplink re-synchronization procedure;
      perform, based on success of the ECCA check, a clear channel assessment (CCA) check in a subframe preceding the re-synchronization boundary; and
      transmit data beginning at the re-synchronization boundary in response to successfully completing both the CCA check and the ECCA check.

9. The apparatus of claim 8, wherein the uplink re-synchronization procedure has an uplink/downlink subframe configuration assigned to the UE that includes two or more subframe boundaries within a single frame.

10. The apparatus of claim 9, wherein the at least one processor is further configured to receive an idle indication to refrain from data transmission for a predetermined time period prior to one of the two or more subframe boundaries, wherein the ECCA is performed during the predetermined time period in the subframe preceding the re-synchronization boundary.

11. The apparatus of claim 8, wherein the indication is received via one of:
   a system broadcast message;
   semi-static signaling; or
   dynamic signaling.

12. The apparatus of claim 8, wherein the at least one processor is further configured to receive a subsequent status indication in a subsequent frame after receipt of the indication, and wherein the subsequent status indication indicates deactivation of the uplink re-synchronization procedure.

13. The apparatus of claim 8, wherein the indication identifying the uplink re-synchronization procedure further indicates a timing of the re-synchronization boundary.

14. The apparatus of claim 8, wherein the indication is received by monitoring a UE-specific search space.

15. An apparatus configured for wireless communication, comprising:
   means for receiving an indication identifying an uplink re-synchronization procedure for use in an unlicensed spectrum;

means for performing an extended clear channel assessment (ECCA) check prior to a re-synchronization boundary associated with the uplink re-synchronization procedure;

means for performing a clear channel assessment (CCA) check in a subframe preceding the re-synchronization boundary based on success of the ECCA check; and means for transmitting data beginning at the re-synchronization boundary in response to successful completion of both the CCA check and the ECCA check.

16. The apparatus of claim 15, wherein the uplink re-synchronization procedure has an uplink/downlink subframe configuration assignment that includes two or more subframe boundaries within a single frame.

17. The apparatus of claim 16, further comprising means for receiving an idle indication to refrain from data transmission for a predetermined time period prior to one of the two or more subframe boundaries, wherein the ECCA is performed during the predetermined time period in the subframe preceding the re-synchronization boundary.

18. The apparatus of claim 15, wherein the indication is received via one of:
a system broadcast message;
semi-static signaling; or
dynamic signaling.

19. The apparatus of claim 15, further comprising means for receiving a subsequent status indication in a subsequent frame after receipt of the indication, wherein the subsequent status indication indicates deactivation of the uplink re-synchronization procedure.

20. The apparatus of claim 15, wherein the indication identifying the uplink re-synchronization procedure further indicates a timing of the re-synchronization boundary.

* * * * *